B. L. GIFFORD.
SPRINKLING OR SPRAYING DEVICE.
APPLICATION FILED JULY 28, 1913.
1,156,474.
Patented Oct. 12, 1915.
2 SHEETS—SHEET 1.
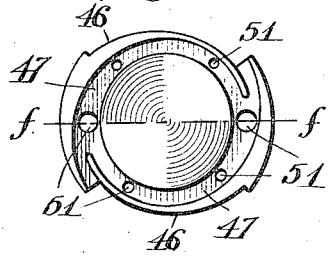
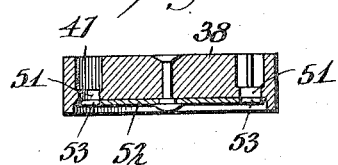
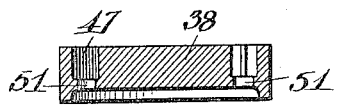
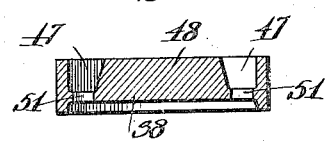
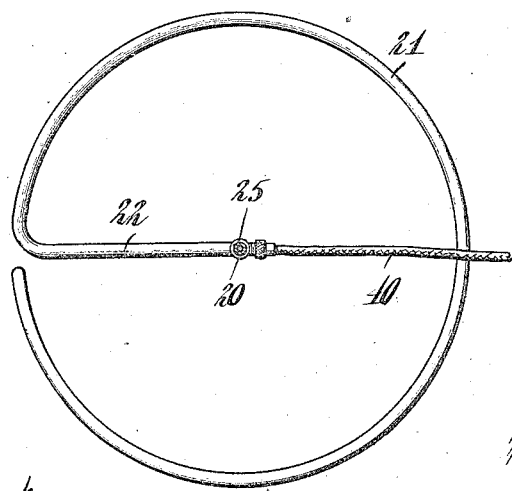
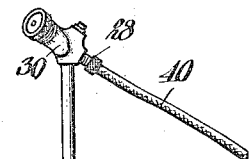
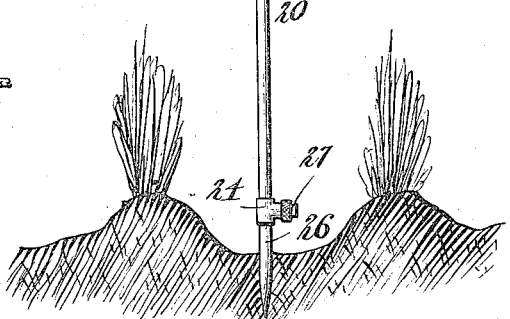
Witnesses:
Jacob Oberst Jr.
Eda M. Schweiger.
Bert L. Gifford, Inventor.
By Emil Neuhart
Attorney.

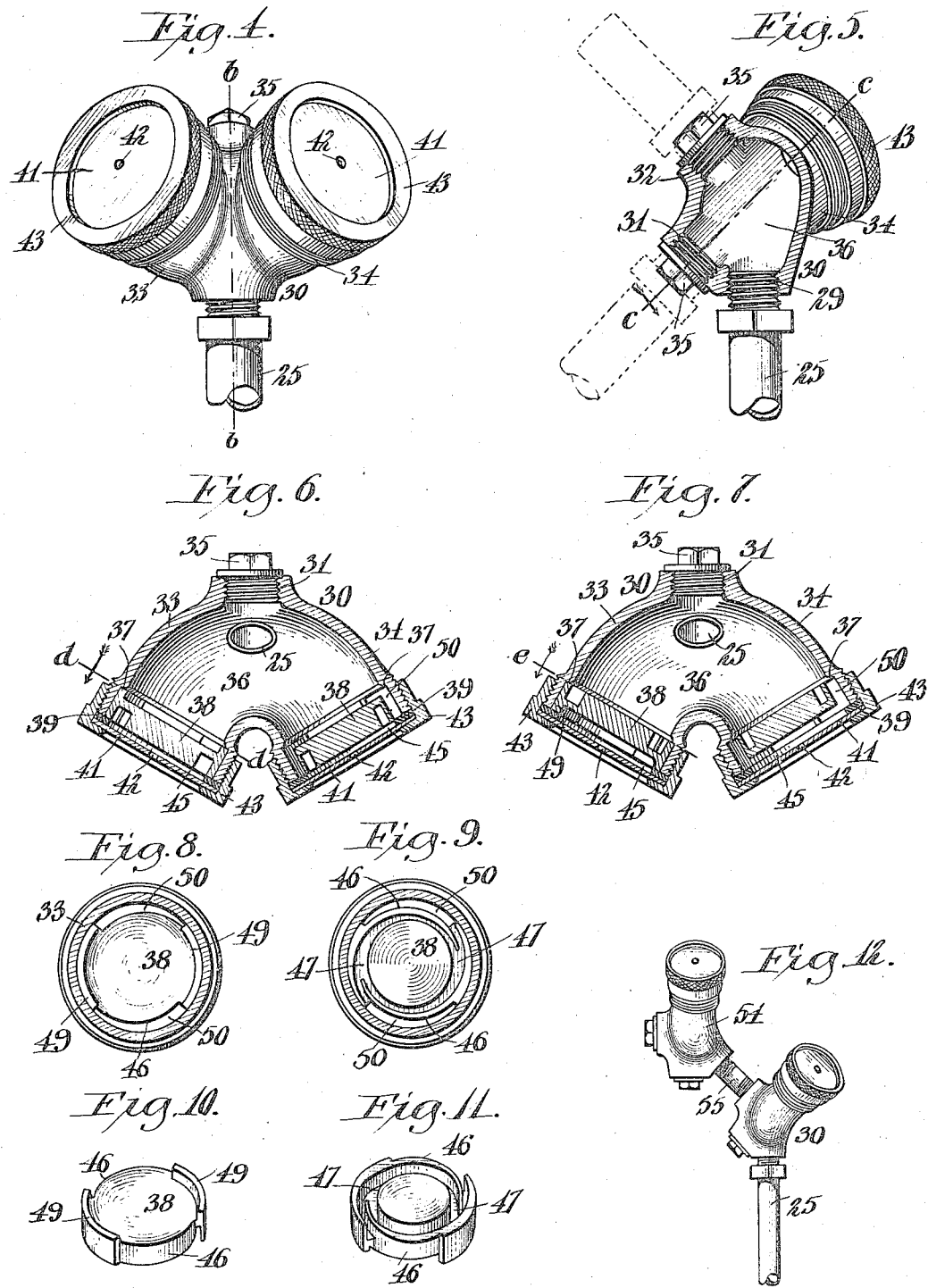

UNITED STATES PATENT OFFICE.

BERT L. GIFFORD, OF BARKER, NEW YORK.

SPRINKLING OR SPRAYING DEVICE.

1,156,474.

Specification of Letters Patent.

Patented Oct. 12, 1915.

Application filed July 28, 1913. Serial No. 781,534.

*To all whom it may concern:*

Be it known that I, BERT L. GIFFORD, a citizen of the United States, residing at Barker, in the county of Niagara and State of New York, have invented certain new and useful Improvements in Sprinkling or Spraying Devices, of which the following is a specification.

My invention relates to sprinkling or spraying devices, and more particularly to that type used in sprinkling lawns and spraying trees and shrubbery.

One of the objects of my invention is to provide an improved sprinkling or spraying device which can be easily moved from place to place upon a lawn without shutting-off the supply of water and without becoming wet, or which can be positioned among shrubbery without in any manner injuring the same.

Another object of my invention is the provision of a device of this type in which interchangeable parts are provided to create a fog or mist, to eject a fine spray, or a drop spray resembling rain.

Further objects are to provide a sprinkling or spraying head which can be arranged at different angles so as to direct the mist or spray directly upward, at an angle of 45 degrees to the vertical, or at an angle of 90 degrees to the vertical so that it may be used in spraying trees, shrubbery, or lawns by merely positioning the nozzle upon the supply pipe or stand in accordance with the direction in which the mist or spray is to be ejected.

A still further object is the provision of a nozzle which will not become clogged in spraying insecticide fluid and by means of which the spray can be spread over a considerable area, or be directed in a substantially straight line so as to confine the spray to a comparatively small area.

With these and other objects in view, my invention consists in the novel stand or support for the sprinkling or spraying nozzle; in the novel features of construction of said nozzle; and in the arrangement and combination of parts to be hereinafter described and particularly pointed out in the subjoined claims.

In the drawings, Figure 1 is a side elevation showing my invention embodied in a representative form. Fig. 2 is a sectional plan view taken on line *a—a*, Fig. 1. Fig. 3 is a side elevation showing the device connected for use in spraying shrubbery, flowers, etc. Fig. 4 is a front elevation of the nozzle head attached to the fluid supply pipe, which serves as a stand or support. Fig. 5 is a vertical section taken on line *b—b*, Fig. 4, the fluid supply pipe being shown in elevation. Figs. 6 and 7 are sections taken on line *c—c*, Fig. 5, looking in the direction of the arrow crossing said line, showing the twirler reversed in the respective figures. Fig. 8 is a transverse section taken on line *d—d*, Fig. 6, looking in the direction of the arrow crossing said line. Fig. 9 is a transverse section taken on line *e—e*, Fig. 7, looking in the direction of the arrow crossing said line. Figs. 10 and 11 are detached perspective views of the twirler member viewed from opposite sides. Fig. 12 is a side elevation showing the nozzle head arranged to form a sprinkling or spraying cluster. Fig. 13 is a plan view of a modified form of twirler member. Fig. 14 is a cross section taken on line *f—f*, Fig. 13. Fig. 15 is a cross section of a twirler member of still further modified form. Fig. 16 is a cross section of a twirler member provided with non-clogging convolute channels.

Referring now to the drawings in detail, like numerals of reference refer to like parts in the several figures.

The reference numeral 20 designates the stand or support of the sprinkler or sprayer, 30 the nozzle head and a hose 40 attached thereto. The stand or support of the device comprises a substantially circular base 21 formed by bending a solid bar of iron into ring form and continuing the same inwardly, as at 22, to the center of the base, thence upwardly, as at 23, with its extremity threaded to enter one branch of a T-fitting 24. To another branch of said fitting the hose 40 is attached, and into the third branch a tube or pipe 25 is threaded, said tube or pipe being directed upwardly and having its upper end threaded and entered into the nozzle head 30. The sprinkling body or support thus secured is adapted for sprinkling lawns, and in this construction the hose is attached to said stand or support at a low point so that by taking hold of the hose, the stand or support may be drawn from one place to another on the lawn without tendency of tipping the same. By thus constructing the stand of the sprinkler, the base 21 is easily removed from the remainder of the same, thus permitting the use of a pointed member 26, which may be threaded into the T-fitting 24 and be thrust into the ground to support the device in the desired position among shrubbery and flowers. When thus used the branch of the T-fitting having the hose 40 shown applied thereto in Figs. 1 and 2, is closed with a plug 27, and the hose 40 is attached directly to the nozzle head, as at 28. In this manner the hose is positioned above the shrubbery or flowers and will in no manner injure the same. The stand or support may be easily removed and is readily set up at any other desired point, as may be found necessary in sprinkling or spraying shrubbery or flowers.

The nozzle head 30 is in the form of a casing having a plurality of threaded inlet-openings 29, 31, 32, respectively, and two diverging exit tubes 33, 34, the casing being provided with enlargements or bosses where said inlet-openings are formed. One of the inlet-openings is arranged in the same plane as the exit tubes 33, 34, a second at an angle of 45 degrees thereto, and the third at an angle of 90 degrees thereto. When said nozzle is used on a stand or support, such as shown in Figs. 1 and 2, two of said inlet-openings are closed with threaded plugs 35, and when used on a stand or support, such as shown in Fig. 3, one of said inlet-openings has the hose 40 or a fitting thereof threaded thereinto.

By arranging the inlet-openings as described, the nozzle may be secured to the pipe or tube 25 of the stand or support in any of three positions, in one of which the exit tubes 33, 34 are in the plane of said tube or pipe, in a second position they are arranged at an angle of 45 degrees to said tube or pipe, and in the third position they are arranged at an angle of 90 degrees to said tube or pipe, thus making it possible to sprinkle or spray in different directions, depending upon the height of the object or objects to be sprinkled.

By providing diverging exit tubes, an expansion chamber 36 is created where the exit tubes join, so that the fluid will always fill the casing and the pressure behind the same will assure an almost constant pressure at the escape openings of the nozzle heads, to be presently described. The outer ends of the exit tubes are enlarged in diameter internally to provide shoulders 37, against each of which is seated a twirler member 38. Bearing against the end of each exit tube and against the marginal portion of each twirler member is a washer 39 against which is seated a disk 41 having a small central escape opening 42, said disk being held in position by an annulus 43 bearing against the marginal portion of the disk, each annulus being threaded onto an exit tube, both of which latter are externally threaded for this purpose. By interposing a washer between the end of each exit tube and the coöperating disk 41 the nozzles are made water tight and at the same time spaces or chambers 45 are provided between the twirlers and said disks.

The twirler comprises a flat substantially circular member having cutaway portions 46 at diametrically opposite points and two convolute passages 47, one end of each passage opening at one cutaway portion and the other end thereof terminating and overlapping the first-mentioned end of the other groove, thus providing passages around a central raised portion 48 which are directed gradually toward the axis of the twirler member.

At points between the cutaway portions 46 each twirler is provided on the opposite face with spacing flanges 49. The portions 46 cut away from the twirler are slightly greater than the faces of the shoulders 37 formed in the casing, which permits the fluid under pressure to pass into the two diametrically opposite spaces 50 formed by the cutaway portions 46 of the twirler, thence into the convolute grooves 47 where it is given a twirling motion, thence into the space or chamber 45 between the twirler and the disk 41 where it is broken up into a fine spray or mist, and finally out of the escape opening 42.

The two bodies of spray or mist ejected from the diverging exit tubes come in contact and become broken up outside of the nozzle body so that all portions within a certain area will be thoroughly sprinkled or sprayed. To a certain extent the size of the escape opening in the disk 41 controls the fineness of spray, but where a somewhat straight stream is desired, the twirler is reversed so that the fluid in passing through the diametrically opposite spaces 50 enters the space or chamber 45 (shown in Fig. 7) without a twirling action and consequently escapes through the escape opening in a comparatively straight line.

Where it is desired to deluge an extended surface or area with a spray of large drops similar to rain, the twirler is provided with a number of openings 51 which are arranged in a circular course at the bottom of the convolute grooves 47. This permits the water to enter the space or chamber 45 of the nozzle in larger quantities and the water entering the apertures is carried in a spiral course with the water entering the convolute grooves through the diametrically opposite spaces 50. When this twirler is used, a disk having a larger escape opening is substituted for the disk 41. A twirler of this type can be readily substituted for the twirler first described.

If it is desired to use a single twirler to deluge an extended area or surface in a manner similar to rain and at times use the same for spraying, a twirler such as shown in Fig. 15 may be used. This sprayer has the apertures 51 therein, but a closure plate 52 is provided on the inner side of the twirler with similar apertures 53 and is centrally and rotatably mounted on the twirler so that in turning the same the apertures 51 in the twirler may be opened or closed.

In Fig. 16 I have shown the inner walls of the convolute grooves 47 beveled, this being brought about by tapering the central portion 48 of the twirler. In spraying fluid insecticide, sediment and particles of foreign matter in the fluid often clog the nozzle, and by thus flaring the inner wall of the convolute grooves the tendency of the outrushing fluid is to free the grooves of all lodging matter, the latter being carried outward onto the central portion 48 of the twirler so as to leave the convolute passages free.

In Fig. 12 I have shown a cluster nozzle and in this arrangement a second nozzle head 54 is employed, the same being connected to any one of the unused inlet openings of the first nozzle head by a nipple 55. By entering this nipple in the desired inlet openings of the two nozzle heads the spray may be ejected in any desired direction, the several jets of fluid escaping coming in contact with each other and being broken up so as to assure every portion of the area sprayed or sprinkled to be thoroughly moistened. Moreover, by using a cluster, the spray or jets of water are extended over a considerably larger area.

Having thus described my invention, what I claim is,—

1. A sprinkling or spraying nozzle comprising a casing having two diverging exit tubes and a plurality of inlet openings arranged at an angle to each other, a supply pipe threaded into any one of said inlet openings, and means for closing the remaining inlet openings.

2. A nozzle comprising a casing having diverging exit tubes, an inlet opening in the plane of said exit tubes, a second inlet opening at an angle of 45 degrees to said first-mentioned inlet opening and a third inlet opening at an angle of 90 degrees to said first-mentioned opening, a supply pipe threaded into one of said openings, and means for closing the other openings.

3. A spraying nozzle comprising a casing having two diverging exit tubes and an expansion chamber common to both of said tubes, said casing having also a plurality of inlet openings opening into said expansion chamber, a supply pipe fitted to any one of said inlet openings, means for closing the other openings, a twirler located in each exit tube, and a disk closing the end of each exit tube held spaced from its coöperating twirler, said disks being fastened to the exit tubes and each having a central exit opening.

4. A spraying nozzle comprising a casing having an exit opening and a plurality of inlet openings arranged at different angles with reference to said exit opening, a supply pipe connected to any one of said inlet openings, and means for closing the other inlet opening or openings.

5. A spraying nozzle comprising a casing having a plurality of inlet openings, a second casing also provided with a plurality of inlet openings, and means of connection between any of the inlets of said casings so as to dispose one at any of a plurality of angles with respect to a supply pipe and the other at any of a plurality of angles with respect to the first.

6. A sprinkling or spraying nozzle comprising a casing having a plurality of exit tubes and a plurality of inlet openings arranged to dispose the casing at different angles so as to direct the spray accordingly, a supply pipe threaded into any one of said inlet openings, and means for closing the remaining inlet openings.

In testimony whereof I affix my signature in presence of two witnesses.

BERT L. GIFFORD.

Witnesses:
　JACOB OBERST, Jr.,
　EMIL NEUHART.